(12) United States Patent
Gentile

(10) Patent No.: US 6,401,665 B1
(45) Date of Patent: Jun. 11, 2002

(54) TETHERED FETCHING, TRAINING, AND PLAY DEVICE FOR ANIMALS

(76) Inventor: Robert Gentile, 30 Wyman Rd., Billerica, MA (US) 01821

( * ) Notice: Subject to any disclaimer, the term of this patent is extended or adjusted under 35 U.S.C. 154(b) by 0 days.

(21) Appl. No.: 09/527,712

(22) Filed: Mar. 17, 2000

(51) Int. Cl.[7] .......................... A01K 15/02; A01K 29/00

(52) U.S. Cl. ...................................................... 119/707

(58) Field of Search ................................ 119/702, 707, 119/708, 709, 710; 446/240, 266

(56) References Cited

U.S. PATENT DOCUMENTS

| | | | | |
|---|---|---|---|---|
| 3,459,158 A | * | 8/1969 | Mitchell, Jr. ................. | 119/708 |
| 5,467,740 A | * | 11/1995 | Redwine ...................... | 119/707 |
| 5,865,146 A | * | 2/1999 | Markham ..................... | 119/707 |
| 6,076,486 A | * | 6/2000 | Oliano ......................... | 119/709 |
| 6,318,300 B1 | * | 11/2001 | Renforth et al. ............. | 119/708 |

FOREIGN PATENT DOCUMENTS

CA 2055243 * 5/1993 ................. 119/707

* cited by examiner

Primary Examiner—Robert P. Swiatek
(74) Attorney, Agent, or Firm—O'Connell Law Firm

(57) ABSTRACT

A tethered fetching, training, and play device for animals comprising an elongate tether, a target projectile, such as a ball, stick, or bone, coupled to a first end of the tether for acting as the target of an animal's attention, and an open inner volume within the target projectile for retaining an animal treat relative to the target projectile. A rotatable handle can be coupled to a second end of the tether to prevent twisting and tangling. The tether and the target projectile can be selectively retracted by a reel that could be spring-loaded or crank operated, and the tether and the target projectile can be selectively projected by a device that could be spring-loaded. One or more resilient members could be disposed at least partially across an entry aperture of the open inner volume to prevent a retained animal treat from becoming unintentionally dislodged. The target projectile can be selectively removable relative to the first end of the elongate tether to allow the target projectile to be used in a non-tethered manner.

11 Claims, 3 Drawing Sheets

TETHERED FETCHING, TRAINING, AND PLAY DEVICE FOR ANIMALS

FIELD OF THE INVENTION

The present invention relates generally to training and play devices for animals. Stated more particularly, disclosed herein is a tethered device for playing with and teaching animals, such as dogs and cats, to perform tasks and tricks, such as fetching, jumping, and the like.

BACKGROUND OF THE INVENTION

Since first domesticating dogs, mankind has endeavored to teach these pets to perform a variety of tasks and tricks. Certain tasks are essentially utilitarian in nature. For example, the hunters dog will be skilled in fetching and retrieving prey at the hunters behest. This utilitarian task advantageously obviates the need for the hunter to traipse through marshy, brambly, or otherwise inaccessible ground surfaces.

Other tasks are fundamentally playful in nature and are designed to provide exercise and enjoyment both to the pet owner and the pet For example, many dog owners find enjoyment and fitness for the owner and his or her dog in a game of fetch. In playing fetch, the dog owner typically will toss a ball, stick, or other game projectile away from him or herself and the dog. With this, the obedient and well-trained dog will run toward the direction of the game projectile's throw, search for the projectile as necessary, and then pick up the stick, ball, or the like with the dog's mouth. With projectile in mouth, the animal will return to its master so that the cycle can be repeated.

Although many dogs take to fetching nearly instinctively, the experienced reader will appreciate that not all dogs are possessed of the natural inclination, desire, or apparent understanding to, firstly, chase down a game projectile and, additionally or alternatively, to carry the thrown object back to the owner who, moments ago threw the object away. Few things are more comically frustrating than the dog that watches its excited owner throw the game projectile, stands pat, and casts an apparently bewildered, curious stare at its owner from a tilted head. Just as uncooperative is the animal that chases down the ball or stick only to pick it up and continue running happily away from the frustrated owner.

With continued training and practice, some of these otherwise recalcitrant animals can be conditioned over time to run and retrieve thrown articles whereby the effective difference to the owner is limited to the time and effort required to train the dog. Disadvantageously, though, that time and effort can be extensive under conventional training techniques. Also, effective training requires, at a minimum, sufficient patience and often some knowledge or natural ability to deal with animals. One will further note that there are other types of dogs that simply resist even the most diligent training when conventional training methods are employed.

As a result, many dogs are never properly taught to fetch and retrieve thrown articles, such as balls, sticks, and the like. For the typical dog owner, although the overall function of the dog as a playmate and companion continues, this inability unavoidably limits the fun and exercise that the owner and his or her dog can enjoy. For the hunter or other utilitarian dog owner where the dog is as much a tool as a companion, the utility of the dog is nearly obviated.

In another vein, one will appreciate that, even where a dog is capable of fetching and retrieving, doing so repetitively can become uninteresting over time. With this, an owner and his or her dog's time spent playing together can be cut short by waning interest on the part of one or both participants. Consequently, the owner and the dog each are deprived of useful and enjoyable moments of exercise and play.

Taking the foregoing into consideration, one will appreciate that there is a real need on the part of owners and animals alike that would enable an owner of an animal, such as a dog or cat, to teach the animal to fetch and retrieve in a simple, effective, and enjoyable manner. It will be further appreciated that animal owners and their pets would be well served by a device that enables the two to participate in a variety of training and play endeavors even beyond fetching and retrieving.

SUMMARY OF THE INVENTION

Advantageously, the present invention is founded on the basic object of providing a device capable of enabling an animal owner and his or her pet to engage in a variety of training and play endeavors.

An underlying object of the invention is to provide a device that would enable an owner of an animal, such as a dog or cat, to train the animal to fetch and retrieve simply, effectively, and enjoyably.

A further object of the invention is to provide a device for enabling animal owners and pets alike to enjoy fun and exercise together for extended periods of time.

Still another object of the invention is to provide a device that enables an animal owner to ensure that the animal is capable of performing utilitarian tasks, such as assisting hunters or retrieving selected objects.

Undoubtedly, these and still further objects of the invention will be obvious not only to one who has an opportunity to review the present specification and drawings but also to one who has an opportunity to make use of an embodiment of the present invention for a tethered fetching, training, and play device for animals.

In accomplishing these objects, a most basic embodiment of the instant invention for a tethered fetching, training, and play device for animals comprises an elongate tether, a target projectile for being tossed, thrown, or moved and thereby acting as the target of an animals attention, a means for coupling the target projectile to the first end of the elongate tether, and a means for retaining an animal treat relative to the target projectile. The particular shape and size of the target projectile certainly could vary widely within the scope of the invention. For example, the target projectile could be or simulate a stick, a ball, a bone, or substantially any other article that an animal might be inclined or motivated to chase or seize.

Under even this most simple embodiment of the invention, an animal treat can be retained relative to the target projectile to act as a motivational tool to entice the animal to chase and seize the target projectile. With this, a user can employ the tethered device to train an animal to perform tasks and tricks, such as fetching and retrieving. A user might begin to do so by retaining the second end of the elongate tether and tossing, throwing, or otherwise moving the target projectile relative to the user and the animal. With this, the animal, knowing of the retained animal treat, will tend to chase and seize the target projectile. The user can then instruct the animal to return with the target projectile. If necessary, the user can compel the animal to return by drawing on the elongate tether to pull the target projectile, the retained treat, and the animal to the user. By doing this as many times as may be necessary, a user can train the animal to fetch and retrieve simply, effectively, and conveniently. Of course, one will readily appreciate that the device could be used relative to a plurality of additional training and play endeavors.

A preferred embodiment of the invention will further comprise a handle disposed at the second end of the elongate tether. Preferably, the handle will be rotatably coupled to the second end of the elongate tether. With this, disadvantageous twisting and tangling of the elongate tether can be avoided. Also, certain embodiments of the invention could include further a means for removably attaching the target projectile to the first end of the elongate tether. One such means could comprise a bore hole with a channel therein in combination with a coupling rod with at least one spring-loaded member for engaging the channel in the bore hole when the coupling rod is matingly received in the bore hole.

In certain embodiments, there may be further provided a means for selectively retracting the elongate tether so that a user can selectively cause the elongate tether and the target projectile to assume a retracted position. That means could comprise a spring-loaded reel, a crank-operated reel, or any other appropriate means. With this, a user could readily draw the target projectile back to him or her for a succeeding throw or the like. Still greater advantage could be realized by providing a means, such as a spring-loaded device, for selectively projecting the target projectile away from a user thereby simplifying the task of throwing or tossing the target projectile.

One will appreciate that the means for retaining an animal treat relative to the target projectile could assume a wide variety of forms that each would be well within the scope of the invention. One such means could comprise an open inner volume within the game projectile that would have an entry aperture. Under such a configuration, an animal treat could be at least partially inserted into the open inner volume through the entry aperture. This structure could be improved by a means for preventing a retained animal treat from becoming unintentionally dislodged from its position at least partially within the open inner volume. By way of example, such a means could be in the form of at least one resilient member disposed at least partially across the entry aperture of the open inner volume for preventing a retained animal treat from becoming unintentionally dislodged. The at least one resilient member would essentially act as a movable obstruction or finger for effectively blocking an animal treat from popping out of the open inner volume. In one embodiment, the means for preventing a dislodging of the animal treat could comprise a plurality of such fingers or resilient members. In such a case, each of the resilient members could project from a periphery of the entry aperture toward a central portion of the entry aperture.

With a plurality of embodiments of the present invention for a tethered fetching, training, and play device referenced above, one will appreciate that the foregoing discussion broadly outlines the more important features of the invention merely to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

To assist one in better understanding and, in appropriate circumstances, practicing the present invention, certain preferred embodiments of the present invention for a tethered fetching, training, and play device are shown in the accompanying figures and are described with particularity below.

Figure 1:
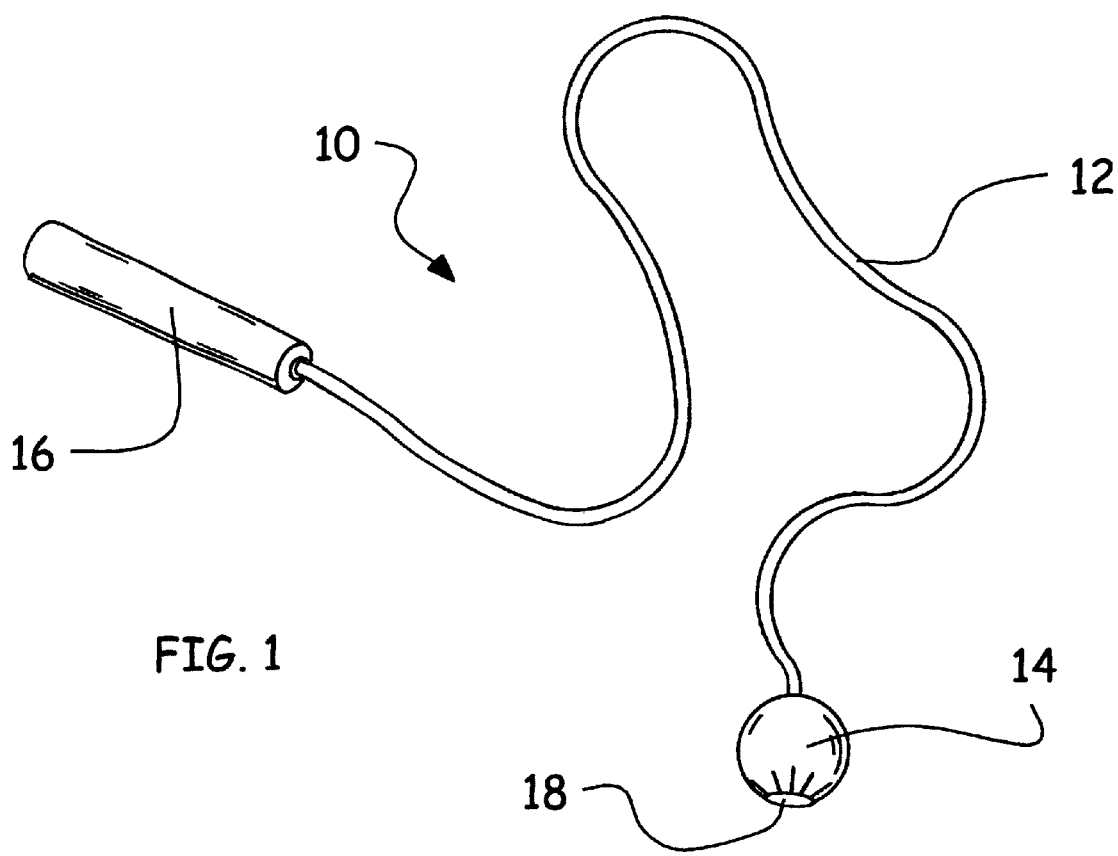
FIG. 1 is a perspective view of a tethered fetching, training, and play device according to the present invention.

Looking more particularly to FIG. 1, one sees an embodiment of the tethered fetching, training, and play device indicated generally at 10. In this preferred embodiment, the tethered device 10 is founded on a flexible elongate tether 12. A target projectile 14, which in this case comprises a hollow spherical ball, is coupled to a first end of the elongate tether 12, and a handle 16 is coupled to a second end of the elongate tether 12.

The elongate tether 12 certainly could be formed of a number of materials. Preferably, the tether 12 will be both durable and flexible. With this, the tether 12 could be formed from rope or chord, nylon filament, flexible plastic tubing, or any other of the plurality of materials that would be obvious to one skilled in the art In this embodiment, the handle 16 is rotatably coupled to the second end of the elongate tether 12. Of course, this could be accomplished in a number of ways that would occur to one knowledgeable in the art For example, the rotatable connection could be formed by ball bearings or by any other appropriate mechanism.

Figure 2:
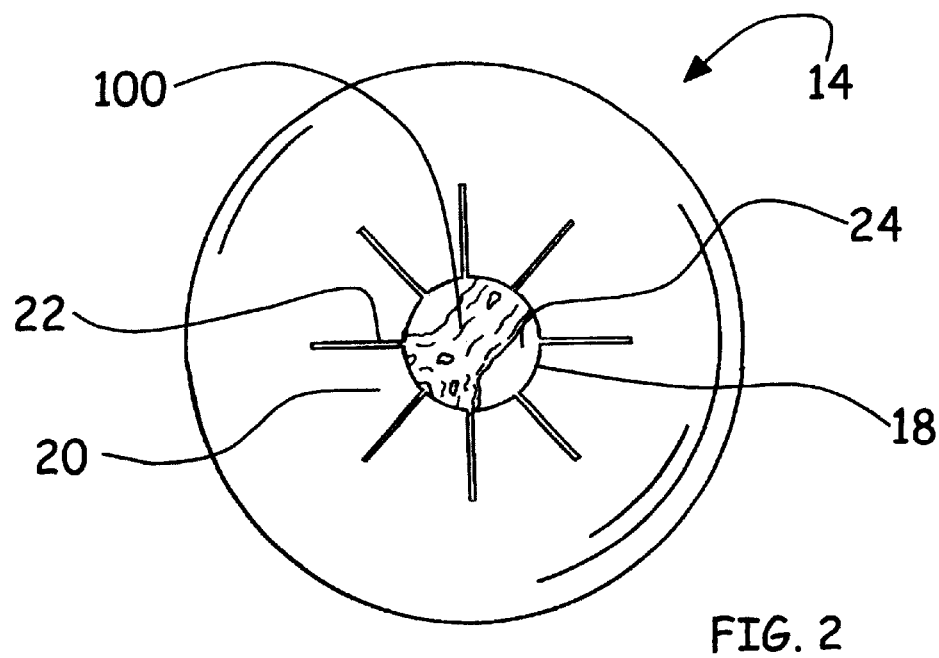
FIG. 2 is a bottom plan view of an embodiment of a target projectile according to the present invention.

As FIG. 1 indicates and as FIG. 2 shows most clearly, the target projectile 14 has an entry aperture 18 that provides access to an open inner volume 24 within the hollow, spherical target projectile 14. A plurality of resilient members 20 each project from a periphery of the entry aperture 18 toward a central portion of the entry aperture 18. In this embodiment, the resilient members 20 are formed unitarily and of the same material as the remainder of the target projectile 14.

Of course, the target projectile 14, and thus the resilient members 20, may be formed of a wide variety of materials including rubber, plastic, or any other suitable material. Where the resilient members 20 are formed from the same material as the remainder of the target projectile 14, the entry aperture 18 and the resilient members 20 can be created most simply by removing a circular portion of the target projectile 14 to create the central portion of the entry aperture 18 and then by creating a plurality of slices 22 that extend radially from the center of the entry aperture 18.

Advantageously, the entry aperture 18 with the plurality of resilient members 20 together enable a user to insert an animal treat 100 into the open inner volume 24 by pushing the animal treat 100 through the entry aperture 18 to deflect the resilient members 20. Furthermore, once the animal treat 100 is partially or completely inserted into the open inner volume 24, the plurality of resilient members 20 advantageously act as a means for preventing the animal treat 100 from becoming unintentionally dislodged from its position within the open inner volume 24. Of course, the exact type of animal treat 100 that is used is of little consequence and will necessarily vary depending on a number of factors including the type of animal being trained or played with and the animal's diet and preferences.

Figure 3:
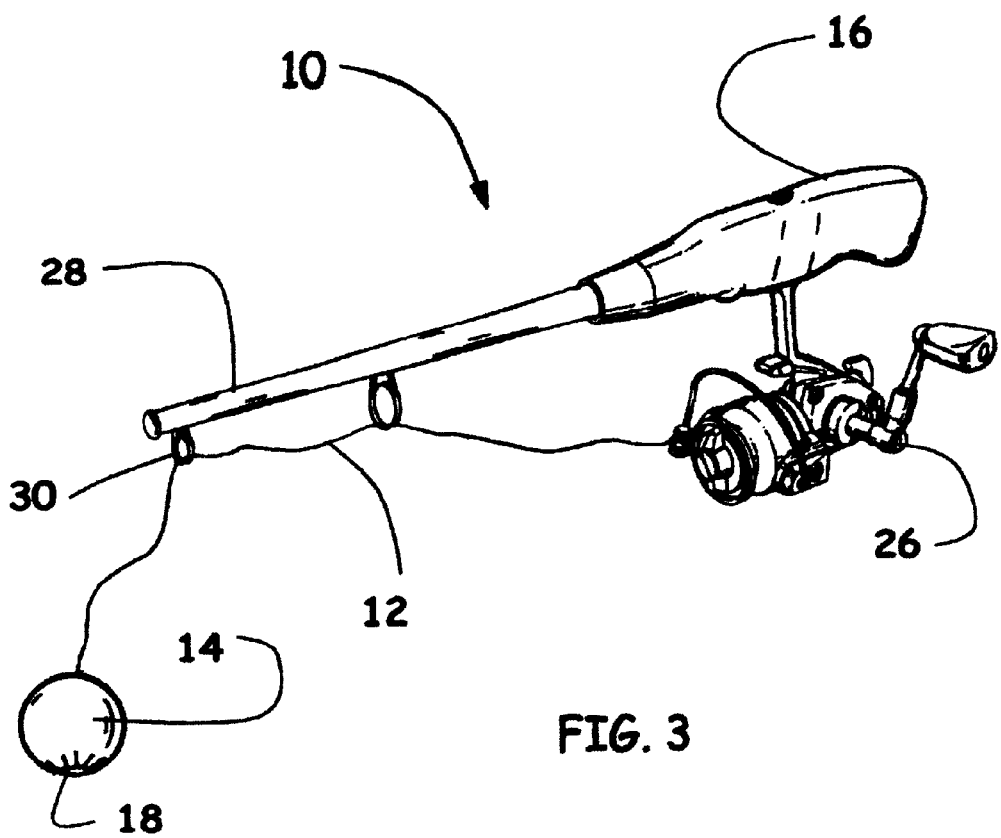
FIG. 3 is a perspective view of an alternative embodiment of the tethered fetching, training, and play device.

An alternatively preferred embodiment of the tethered device 10 is depicted in FIG. 3. In this embodiment, the tethered device 10 further includes a means for selectively retracting the elongate tether 12 and the target projectile 14. With this, a user can selectively cause the elongate tether 12 and the target projectile 14 to assume a retracted position. As one will readily appreciate from FIG. 3, the means for selectively retracting the elongate tether 12 and the target projectile 14 in this case comprises a crank-operated reel 26, which is substantially similar to a standard fishing reel. In this embodiment, the crank-operated reel 26 is retained by the handle 16. Also retained by the handle 16 is a rod portion 28 with guide rings 30 disposed therealong for guiding and retaining the elongate tether 12. With this, a user can employ the rod portion 28 to cast or project the target projectile 14 and the elongate tether 12, and a user can retract the elongate tether 12 and the target projectile 14 by cranking the reel 26.

Figure 4:
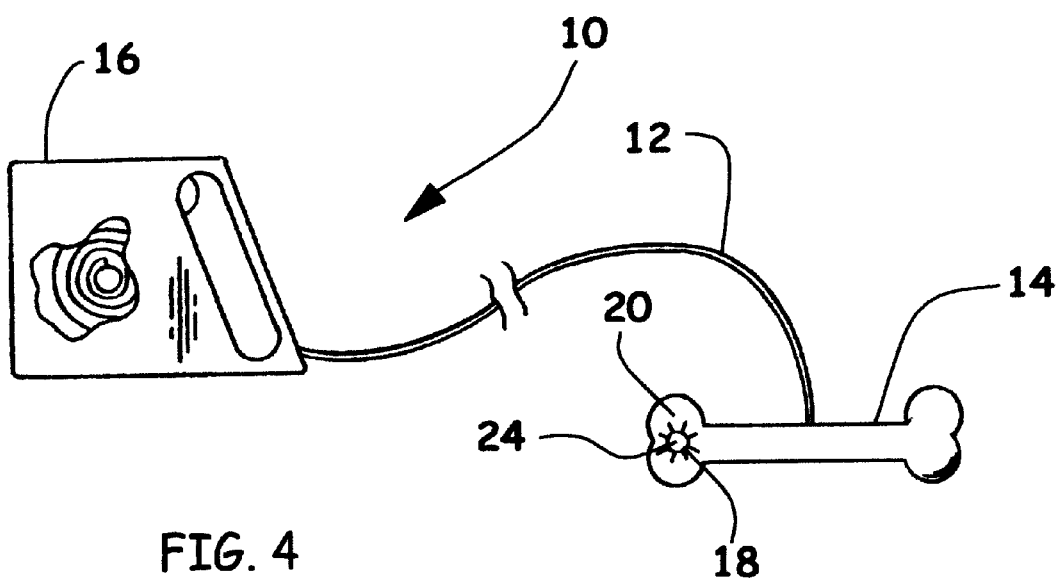
FIG. 4 is a view in side elevation of another alternative embodiment of the instant invention.

FIG. 4 shows an alternative means for selectively retracting the elongate tether 12 and the target projectile 14. In this embodiment, the elongate tether 12 again has a target projectile 14 coupled to a first end thereof and a handle 16 coupled to its second end. However, the handle 16 in this embodiment comprises a spring-loaded reel of a type that would be well known in the art. For example, the spring-loaded reel could be similar to that employed in a typical retractable tape measure or in a typical vacuum cleaner with a retractable power chord. A further variation in this embodiment is that the target projectile 14 does not comprise a spherical ball but instead comprises a stereotypical bone-shaped member that again houses an open inner volume 24 with an entry aperture 18 and includes a plurality of resilient members 20. This variation is exemplary of the wide variety of shapes and sizes that the target projectile 14 could assume that would be well within the scope of the present invention.

Figure 5:
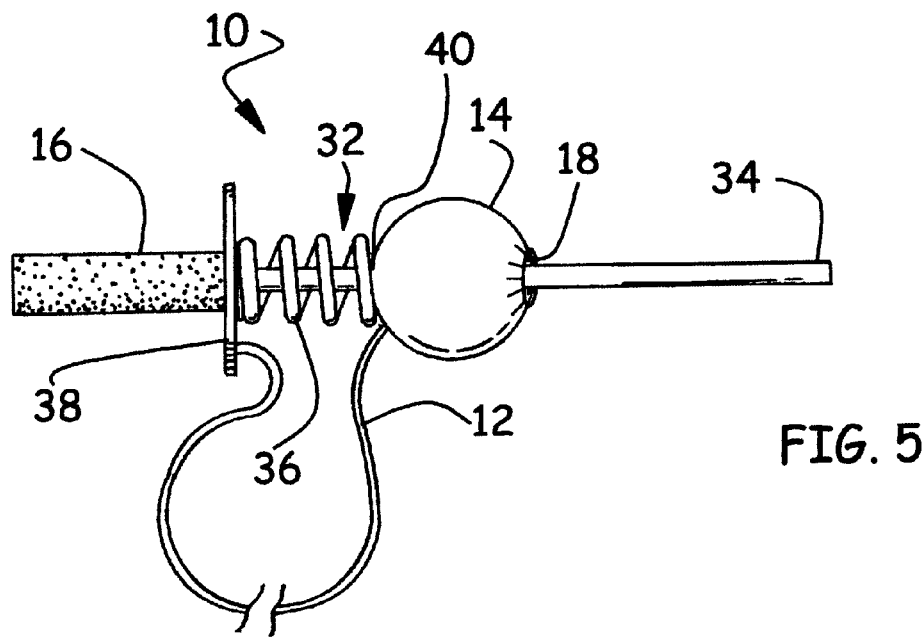
FIG. 5 is a view in side elevation of still another embodiment of the invention.

FIG. 5 depicts still another embodiment of the invention. In this case, the tethered device 10 incorporates the same essential components, namely, an elongate tether 12 with a target projectile 14 coupled to its first end and a handle 16 coupled to its second end. However, in this embodiment the handle 16 further comprises a means for selectively projecting the target projectile away from a user. Of course, a plurality of possible means for projecting the target projectile would occur to one skilled in the art. For example, the projecting means could comprise a slingshot mechanism, a catapult mechanism, or any other appropriate means.

In FIG. 5, the projecting means comprises a spring-loaded projecting device, which is indicated generally at 32. The spring-loaded projecting device 32 is founded on an elongate rod 34 that projects from a stop member 38 that is fixed to the handle 16. A compression spring 36 surrounds the elongate rod 34 and has a first end disposed to adjacent to the stop member 38 and a second end for engaging the target projectile 14, which in this case has a bore hole 40 that cooperates with the entry aperture 18 to receive see the elongate rod 34 therethrough.

Under this arrangement, with an animal treat (not shown in FIG. 5) already inserted into the open inner volume of the target projectile 14, the elongate rod 34 can be inserted is through the bore hole 40 and the entry aperture 18. The target projectile 14 can then be slid proximally along the elongate rod 34 to compress the compression spring 36. With this, a user can release the target projectile 14 to allow the compression spring 36 to expand thereby projecting the target projectile 14 and the elongate tether 12 away from the user.

Figure 6:
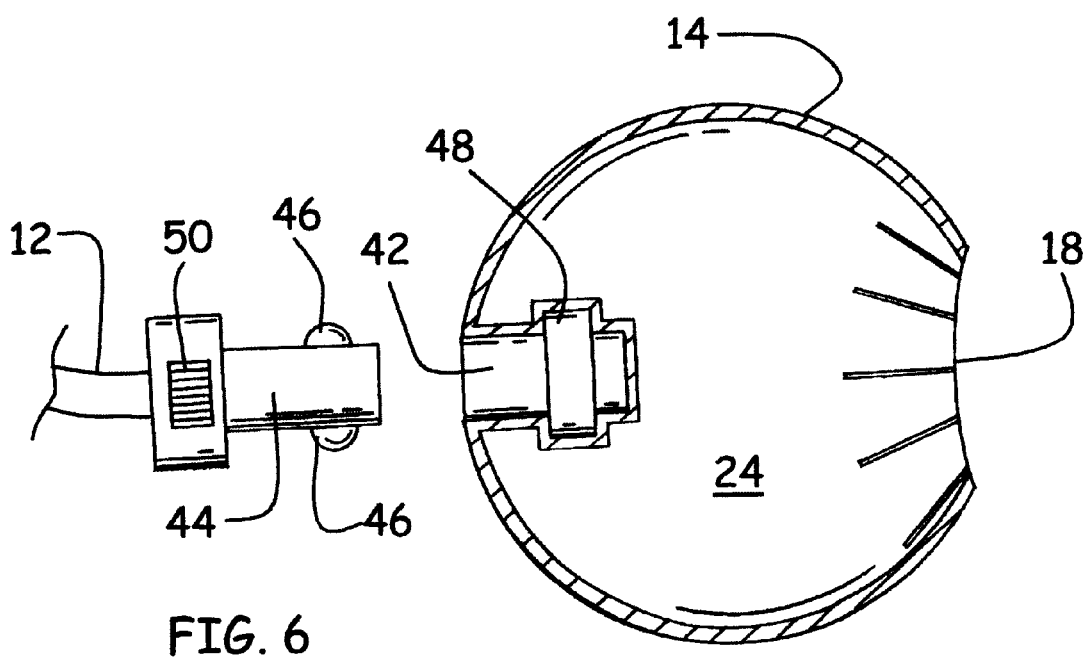
FIG. 6 is a view in side elevation of a means for removably coupling a target projectile to the first end of the elongate tether.

Looking finally to FIG. 6, one sees that the first end of the elongate tether 12 could be removably coupled to the target projectile 14. Such an arrangement could be useful for a number of reasons. By allowing the target projectile 14 to be selectively removable from the end of the elongate tether 12, a user can employ the target projectile 14 in a non-tethered manner. This may be advantageous, for example, where the animal owner believes that the animal has been trained sufficiently such that it will retrieve the target projectile 14 and do other tricks even without prompting by the owner. In such a situation, the owner can employ the same target projectile 14 that the animal has become conditioned to retrieve whereby the animal may be more likely to comply with an owners commands than the animal might with an entirely different target projectile. Furthermore, using the same target projectile 14 again allows for the owner to insert an animal treat (not shown in this figure) into the open inner volume 24. Still further, the removable attachment of the target projectile 14 to the elongate tether 12 enables the target projectile 12 to be readily replaced when necessary due to damage or the like.

Of course, the means for removably attaching the target projectile 14 to the first end of the elongate tether 12 could assume a number of forms that would be well within the scope of the invention. However, a presently preferred means is depicted in FIG. 6 where it comprises a bore hole 42, which in this case is in the target projectile 14, and a coupling rod 44, which in this case is fixed to the first end of the elongate tether 12, that can be matingly received in the bore hole 42. Advantageously, the coupling rod 44 can be selectively fixed inside the bore hole 42 by a pair of spring-loaded ball bearings 46 that project from the coupling rod 44 in cooperation with an annular channel 48 in the bore hole 42. As one skilled in the art will appreciate, when the coupling rod 44 is fully received in the bore hole 42, the ball bearings 46 will spring into the channel 48 thereby locking the coupling rod 44 in place. When the coupling rod 44 is to be removed, a user can depress button 50 thereby allowing the ball bearings 46 to retract freely to release the coupling rod 44 relative to the bore hole 42.

From the foregoing, one will appreciate that the present invention for a tethered fetching, training, and play device 10 for animals achieves a number of objects and advantages. Most basically, with a target projectile 14 coupled to an end of an elongate tether 12, the tethered device 10 enables an animal owner and his or her pet to engage in a variety of training and play endeavors. More particularly, the tethered device 10 enables owners of animals, such as dogs or cats, to train the animal to fetch and retrieve simply, effectively, and enjoyably. Furthermore, by using the tethered device 10, animal owners and pets alike can enjoy fun and exercise together for extended periods of time. Still further, the tethered device 10 enables an animal owner to ensure that the animal is capable of performing utilitarian tasks, such as assisting hunters or retrieving selected objects. Certainly these and further advantages deriving from the plurality of disclosed embodiments of the invention will be apparent both to one who has reviewed the present disclosure and to one who has had an opportunity to make use of one or more embodiments of the present invention for a tethered fetching, training, and play device 10 for animals.

Of course, one skilled in the art will be aware that the present invention has been shown and described with reference to certain preferred embodiments that merely exemplify the broader invention revealed herein. Certainly those skilled in the art could conceive of alternative embodiments after learning of the present invention. For instance, those with the major features of the invention in mind could craft embodiments that incorporate those major features while not incorporating all of the features included in the preferred embodiments. With the foregoing in mind, the following claims are intended to define the scope of protection to be afforded the inventor, and the claims shall be deemed to include equivalent constructions insofar as they do not depart from the spirit and scope of the present invention.

It must be noted that a plurality of the following claims express certain elements as a means for performing a specific function, at times without the recital of structure or material. As the law demands, these claims shall be construed to cover not only the corresponding structure and material expressly described in the specification but also equivalents thereof.

I claim as deserving the protection of United States Letters Patent:

1. A tethered fetching, training, and play device for animals, the tethered device comprising:
   an elongate tether with a first end and a second end;
   a target projectile for being tossed, thrown, or moved and thereby acting as the target of an animal's attention wherein the target projectile is coupled to the first end of the elongate tether;
   a handle coupled for 360 degree rotation to the second end of the elongate tether whereby twisting and tangling of the elongate tether can be avoided; and
   a means for retaining an animal treat relative to the target projectile whereby an animal treat can be retained relative to the target projectile to act as a motivational tool to entice the animal to chase and seize the target projectile;
   whereby a user can employ the tethered device to train an animal to perform tasks and tricks, such as fetching and retrieving, by retaining the second end of the elongate tether, tossing, throwing, or moving the target projectile relative to the user and the animal whereupon the animal, knowing of the retained animal treat, will tend to chase and seize the target projectile so that the user can instruct the animal to return with the game projectile and, if necessary, can compel the animal to return by drawing on the elongate tether to pull the target projectile, the retained treat, and the animal to the user.

2. The tethered device of claim 1 wherein the means for retaining an animal treat comprises an open inner volume within the target projectile wherein the open inner volume has an entry aperture whereby an animal treat can be at least partially inserted in to the open inner volume through the entry aperture.

3. The tethered device of claim 2 further comprising a means for preventing a retained animal treat from becoming unintentionally dislodged from its position at least partially within the open inner volume.

4. The tethered device of claim 3 wherein the means for preventing a retained animal treat from becoming unintentionally dislodged comprises at least one resilient member disposed at least partially across the entry aperture of the open inner volume for preventing a retained animal treat from becoming unintentionally dislodged.

5. The tethered device of claim 4 wherein the means for preventing a retained animal treat from becoming unintentionally dislodged comprises a plurality of resilient members each projecting from a periphery of the entry aperture toward a central portion of the entry aperture.

6. The tethered device of claim 1 wherein the target projectile comprises a ball.

7. The tethered device of claim 6 wherein the means for retaining an animal treat comprises an open inner volume within the ball wherein the open inner volume has an entry aperture whereby the animal treat can be at least partially inserted into the open inner volume through the entry aperture.

8. The tethered device of claim 7 further comprising a means for preventing a retained animal treat from becoming unintentionally dislodged from its position at least partially within the open inner volume.

9. The tethered device of claim 8 wherein the means for preventing a retained animal treat from becoming unintentionally dislodged comprises at least one resilient member disposed at least partially across the entry aperture of the open inner volume for preventing a retained animal treat from becoming unintentionally dislodged.

10. A tethered fetching, training, and play device for animals, the tethered device comprising:
    an elongate tether with a first end and a second end;
    a target projectile comprising a ball coupled to the first end of the elongate tether for being tossed, thrown, or moved and thereby acting as the target of an animal's attention;
    a means for retaining an animal treat relative to the target projectile whereby an animal treat can be retained relative to the target projectile to act as a motivational tool to entice the animal to chase and seize the target projectile wherein the means for retaining an animal treat comprises an open inner volume within the target projectile wherein the open inner volume has an entry aperture whereby the animal treat can be at least partially inserted into the open inner volume through the entry aperture; and
    a means for preventing a retained animal treat from becoming unintentionally dislodged from its position at least partially within the open inner volume comprising a plurality of resilient members each projecting from a periphery of the entry aperture toward a central portion of the entry aperture;
    whereby a user can employ the tethered device to train an animal to perform tasks and tricks, such as fetching and retrieving, by retaining the second end of the elongate tether, tossing, throwing, or moving the target projectile relative to the user and the animal whereupon the animal, knowing of the retained animal treat, will tend to chase and seize the target projectile and the user can instruct the animal to return with the game projectile and, if necessary, can compel the animal to return by drawing on the elongate tether to pull the target projectile, the retained treat, and the animal to the user.

11. A tethered fetching, training, and play device for animals, the tethered device comprising:

an elongate tether with a first end and a second end;

a target projectile for being tossed, thrown, or moved and thereby acting as the target of an animal's attention wherein the target projectile is coupled to the first end of the elongate tether;

a means for retaining an animal treat relative to the target projectile whereby an animal treat can be retained relative to the target projectile to act as a motivational tool to entice the animal to chase and seize the target projectile; and a means for removably attaching the target projectile to the first end of the elongate tether comprising a bore hole with a channel therein in combination with a coupling rod with at least one spring-loaded member for engaging the channel in the bore hole when the coupling rod is matingly received in the bore hole;

whereby a user can employ the tethered device to train an animal to perform tasks and tricks, such as fetching and retrieving, by retaining the second end of the elongate tether, tossing, throwing, or moving the target projectile relative to the user and the animal whereupon the animal, knowing of the retained animal treat, will tend to chase and seize the target projectile and the user can instruct the animal to return with the game projectile and, if necessary, can compel the animal to return by drawing on the elongate tether to pull the target projectile, the retained treat, and the animal to the user.

\* \* \* \* \*